(12) United States Patent
Martin et al.

(10) Patent No.: US 7,945,568 B1
(45) Date of Patent: May 17, 2011

(54) SYSTEM FOR BROWSING THROUGH A MUSIC CATALOG USING CORRELATION METRICS OF A KNOWLEDGE BASE OF MEDIASETS

(75) Inventors: Francisco J. Martin, Corvallis, OR (US); Jim Shur, Corvallis, OR (US); Marc Torrens, Corvallis, OR (US)

(73) Assignee: Strands, Inc., Corvallis, OR (US)

( * ) Notice: Subject to any disclaimer, the term of this patent is extended or adjusted under 35 U.S.C. 154(b) by 0 days.

(21) Appl. No.: 12/984,259

(22) Filed: Jan. 4, 2011

Related U.S. Application Data

(63) Continuation of application No. 12/858,229, filed on Aug. 17, 2010, now abandoned, which is a continuation of application No. 11/349,370, filed on Feb. 6, 2006, now Pat. No. 7,797,321.

(60) Provisional application No. 60/649,945, filed on Feb. 4, 2005.

(51) Int. Cl.
*G06F 7/00* (2006.01)
*G06F 17/30* (2006.01)
(52) U.S. Cl. .................. 707/737; 707/915; 707/948
(58) Field of Classification Search ............... 707/737
See application file for complete search history.

(56) References Cited

U.S. PATENT DOCUMENTS

| | | | |
|---|---|---|---|
| 5,355,302 A | 10/1994 | Martin | |
| 5,375,235 A | 12/1994 | Berry | |
| 5,464,946 A | 11/1995 | Lewis | |
| 5,483,278 A | 1/1996 | Strubbe | |
| 5,583,763 A | 12/1996 | Atcheson | |
| 5,724,521 A | 3/1998 | Dedrick | |
| 5,754,939 A | 5/1998 | Herz | |
| 5,758,257 A | 5/1998 | Herz | |
| 5,890,152 A | 3/1999 | Rapaport | |
| 5,918,014 A | 6/1999 | Robinson | |
| 5,950,176 A | 9/1999 | Keiser | |
| 6,000,044 A | 12/1999 | Chrysos | |
| 6,047,311 A | 4/2000 | Ueno | |
| 6,112,186 A | 8/2000 | Bergh | |
| 6,134,532 A | 10/2000 | Lazarus | |
| 6,345,288 B1 | 2/2002 | Reed | |
| 6,346,951 B1 | 2/2002 | Mastronardi | |

(Continued)

FOREIGN PATENT DOCUMENTS

EP 1 050 833 8/2000

(Continued)

OTHER PUBLICATIONS

Hofmann, T. "Latent Semantic Models for Collaborative Filtering". ACM Transactions on Information Systems, 22:89-115, 2004.

(Continued)

*Primary Examiner* — John Cottingham
*Assistant Examiner* — Nicholas E Allen
(74) *Attorney, Agent, or Firm* — Stolowitz Ford Cowger LLP

(57) ABSTRACT

A system and method to navigate through a media item catalog and generate recommendations using behavioral metrics such as correlation metrics (FIGS. 1,2) from a knowledge base (400) of mediasets (FIG. 4, 1-7). One implementation uses a knowledge base comprising a collection of mediasets. Various metrics (Metric 1-Metric m) among media items ($m_1 \ldots$) are considered by analyzing how the media items are grouped to form the sets in the knowledge base (400). Such metrics preferably are stored in a matrix (100) that allows the system to dynamically build appropriate navigation lists (FIG. 3) from media items that a user selects (FIG. 5).

15 Claims, 4 Drawing Sheets

U.S. PATENT DOCUMENTS

| | | |
|---|---|---|
| 6,347,313 B1 | 2/2002 | Ma |
| 6,349,339 B1 | 2/2002 | Williams |
| 6,381,575 B1 | 4/2002 | Martin |
| 6,430,539 B1 | 8/2002 | Lazarus |
| 6,434,621 B1 | 8/2002 | Pezzillo |
| 6,438,579 B1 | 8/2002 | Hosken |
| 6,487,539 B1 | 11/2002 | Aggarwal |
| 6,526,411 B1 | 2/2003 | Ward |
| 6,532,469 B1 | 3/2003 | Feldman et al. ............ 707/102 |
| 6,577,716 B1 | 6/2003 | Minter |
| 6,587,127 B1 | 7/2003 | Leeke |
| 6,615,208 B1 | 9/2003 | Behrens |
| 6,647,371 B2 | 11/2003 | Shinohara |
| 6,687,696 B2 | 2/2004 | Hofmann |
| 6,690,918 B2 | 2/2004 | Evans |
| 6,704,576 B1 | 3/2004 | Brachman |
| 6,748,395 B1 | 6/2004 | Picker |
| 6,751,574 B2 | 6/2004 | Shinohara |
| 6,785,688 B2 | 8/2004 | Abajian |
| 6,842,761 B2 | 1/2005 | Diamond |
| 6,850,252 B1 | 2/2005 | Hoffberg |
| 6,914,891 B2 | 7/2005 | Ha |
| 6,931,454 B2 | 8/2005 | Deshpande |
| 6,947,922 B1 | 9/2005 | Glance |
| 6,950,804 B2 | 9/2005 | Strietzel |
| 6,987,221 B1 | 1/2006 | Platt |
| 6,990,497 B2 | 1/2006 | O'Rourke |
| 6,993,532 B1 | 1/2006 | Platt |
| 7,020,637 B2 | 3/2006 | Bratton |
| 7,021,836 B2 | 4/2006 | Anderson |
| 7,043,479 B2 | 5/2006 | Ireton |
| 7,051,352 B1 | 5/2006 | Schaffer |
| 7,072,846 B1 | 7/2006 | Robinson |
| 7,082,407 B1 | 7/2006 | Bezos |
| 7,111,240 B2 | 9/2006 | Crow |
| 7,113,917 B2 | 9/2006 | Jacobi |
| 7,113,999 B2 | 9/2006 | Pestoni |
| 7,120,619 B2 | 10/2006 | Drucker |
| 7,127,143 B2 | 10/2006 | Elkins |
| 7,136,866 B2 | 11/2006 | Springer, Jr. |
| 7,139,723 B2 | 11/2006 | Conkwright |
| 7,174,126 B2 | 2/2007 | McElhatten |
| 7,180,473 B2 | 2/2007 | Horie |
| 7,194,421 B2 | 3/2007 | Conkwright |
| 7,197,472 B2 | 3/2007 | Conkwright |
| 7,236,941 B2 | 6/2007 | Conkwright |
| 7,256,341 B2 | 8/2007 | Plastina |
| 7,302,419 B2 | 11/2007 | Conkwright |
| 7,302,468 B2 | 11/2007 | Wijeratne |
| 7,358,434 B2 | 4/2008 | Plastina |
| 7,363,314 B2 | 4/2008 | Picker |
| 7,392,212 B2 | 6/2008 | Hancock |
| 7,403,769 B2 | 7/2008 | Kopra |
| 7,415,181 B2 | 8/2008 | Greenwood |
| 7,434,247 B2 | 10/2008 | Dudkiewicz |
| 7,457,862 B2 | 11/2008 | Hepworth |
| 7,478,323 B2 | 1/2009 | Dowdy |
| 7,499,630 B2 | 3/2009 | Koch |
| 7,505,959 B2 | 3/2009 | Kaiser |
| 7,546,254 B2 | 6/2009 | Bednarek |
| 7,568,213 B2 | 7/2009 | Carhart |
| 7,574,422 B2 | 8/2009 | Guan |
| 7,574,513 B2 | 8/2009 | Dunning |
| 7,580,932 B2 | 8/2009 | Plastina |
| 7,599,950 B2 | 10/2009 | Walther |
| 7,644,077 B2 | 1/2010 | Picker |
| 7,647,613 B2 | 1/2010 | Drakoulis |
| 7,657,224 B2 | 2/2010 | Goldberg |
| 7,685,204 B2 | 3/2010 | Rogers |
| 7,734,569 B2 | 6/2010 | Martin |
| 7,831,199 B2 | 11/2010 | Ng |
| 7,844,498 B2 | 11/2010 | Robbin |
| 2001/0056434 A1 | 12/2001 | Kaplan |
| 2002/0002899 A1 | 1/2002 | Gjerdingen et al. ............ 84/667 |
| 2002/0042912 A1 | 4/2002 | Iijima |
| 2002/0059094 A1 | 5/2002 | Hosea |
| 2002/0082901 A1 | 6/2002 | Dunning et al. |
| 2002/0152117 A1 | 10/2002 | Cristofalo |
| 2002/0178223 A1 | 11/2002 | Bushkin |
| 2002/0178276 A1 | 11/2002 | McCartney |
| 2002/0194215 A1 | 12/2002 | Cantrell |
| 2003/0033321 A1 | 2/2003 | Schrempp |
| 2003/0055689 A1 | 3/2003 | Block |
| 2003/0120630 A1 | 6/2003 | Tunkelang ............ 707/1 |
| 2003/0182254 A1 | 9/2003 | Plastina et al. ............ 707/1 |
| 2003/0182315 A1 | 9/2003 | Plastina et al. |
| 2003/0212710 A1 | 11/2003 | Guy |
| 2003/0229537 A1 | 12/2003 | Dunning |
| 2004/0002993 A1 | 1/2004 | Toussaint |
| 2004/0003392 A1 | 1/2004 | Trajkovic |
| 2004/0068552 A1 | 4/2004 | Kotz |
| 2004/0073924 A1 | 4/2004 | Pendakur |
| 2004/0128286 A1 | 7/2004 | Yasushi |
| 2004/0139064 A1 | 7/2004 | Chevallier et al. |
| 2004/0148424 A1 | 7/2004 | Berkson |
| 2004/0158860 A1 | 8/2004 | Crow |
| 2004/0162738 A1 | 8/2004 | Sanders |
| 2004/0194128 A1 | 9/2004 | McIntyre |
| 2004/0263337 A1 | 12/2004 | Terauchi et al. |
| 2004/0267715 A1 | 12/2004 | Polson et al. |
| 2005/0005246 A1 | 1/2005 | Card et al. ............ 715/776 |
| 2005/0021470 A1 | 1/2005 | Martin |
| 2005/0060350 A1 | 3/2005 | Baum |
| 2005/0075908 A1 | 4/2005 | Stevens |
| 2005/0091146 A1 | 4/2005 | Levinson |
| 2005/0102610 A1 | 5/2005 | Jie |
| 2005/0114357 A1 | 5/2005 | Chengalvarayan |
| 2005/0141709 A1 | 6/2005 | Bratton |
| 2005/0154608 A1 | 7/2005 | Paulson |
| 2005/0160458 A1 | 7/2005 | Baumgartner |
| 2005/0193014 A1 | 9/2005 | Prince |
| 2005/0193054 A1 | 9/2005 | Wilson |
| 2005/0195696 A1 | 9/2005 | Rekimoto |
| 2005/0203807 A1 | 9/2005 | Bezos |
| 2005/0210101 A1 | 9/2005 | Janik |
| 2005/0216855 A1 | 9/2005 | Kopra et al. |
| 2005/0216859 A1 | 9/2005 | Paek |
| 2005/0222989 A1 | 10/2005 | Haveliwala |
| 2005/0223039 A1 | 10/2005 | Kim |
| 2005/0234891 A1 | 10/2005 | Walther |
| 2005/0235811 A1 | 10/2005 | Dukane |
| 2005/0256867 A1 | 11/2005 | Walther |
| 2005/0276570 A1 | 12/2005 | Reed |
| 2006/0015571 A1 | 1/2006 | Fukuda |
| 2006/0015904 A1 | 1/2006 | Marcus |
| 2006/0018208 A1 | 1/2006 | Nathan |
| 2006/0018209 A1 | 1/2006 | Drakoulis |
| 2006/0020062 A1 | 1/2006 | Bloom |
| 2006/0020662 A1 | 1/2006 | Robinson |
| 2006/0026263 A1 | 2/2006 | Raghavan |
| 2006/0053077 A1 | 3/2006 | Mourad |
| 2006/0062094 A1 | 3/2006 | Nathan |
| 2006/0067296 A1 | 3/2006 | Bershad |
| 2006/0074750 A1 | 4/2006 | Clark |
| 2006/0080356 A1 | 4/2006 | Burges |
| 2006/0091203 A1 | 5/2006 | Bakker |
| 2006/0100978 A1 | 5/2006 | Heller |
| 2006/0112098 A1 | 5/2006 | Renshaw et al. ............ 707/7 |
| 2006/0136344 A1 | 6/2006 | Jones |
| 2006/0143236 A1 | 6/2006 | Wu |
| 2006/0168616 A1 | 7/2006 | Candelore |
| 2006/0173910 A1 | 8/2006 | McLaughlin |
| 2006/0173916 A1 | 8/2006 | Sibley et al. ............ 707/104.1 |
| 2006/0195513 A1 | 8/2006 | Rogers |
| 2006/0195514 A1 | 8/2006 | Rogers |
| 2006/0195515 A1 | 8/2006 | Beaupre |
| 2006/0195516 A1 | 8/2006 | Beaupre |
| 2006/0195521 A1 | 8/2006 | New |
| 2006/0195789 A1 | 8/2006 | Rogers |
| 2006/0195790 A1 | 8/2006 | Beaupre |
| 2006/0253874 A1 | 11/2006 | Stark et al. |
| 2006/0277098 A1 | 12/2006 | Chung |
| 2006/0282311 A1 | 12/2006 | Jiang |
| 2006/0288044 A1 | 12/2006 | Kashiwagi |
| 2006/0288367 A1 | 12/2006 | Swix |
| 2007/0016507 A1 | 1/2007 | Tzara |
| 2007/0043829 A1 | 2/2007 | Dua |

| | | | |
|---|---|---|---|
| 2007/0100690 | A1 | 5/2007 | Hopkins |
| 2007/0118546 | A1 | 5/2007 | Acharya |
| 2007/0136264 | A1 | 6/2007 | Tran |
| 2007/0156677 | A1 | 7/2007 | Szabo |
| 2007/0203790 | A1 | 8/2007 | Torrens |
| 2007/0244880 | A1 | 10/2007 | Martin |
| 2007/0250429 | A1 | 10/2007 | Walser |
| 2007/0250761 | A1 | 10/2007 | Bradley |
| 2007/0422880 | | 10/2007 | Martin |
| 2007/0271286 | A1 | 11/2007 | Purang |
| 2007/0294096 | A1 | 12/2007 | Randall |
| 2008/0004948 | A1 | 1/2008 | Flake |
| 2008/0004990 | A1 | 1/2008 | Flake |
| 2008/0027881 | A1 | 1/2008 | Bisse |
| 2008/0046317 | A1 | 2/2008 | Christianson |
| 2008/0077264 | A1 | 3/2008 | Irvin |
| 2008/0082467 | A1 | 4/2008 | Meijer |
| 2008/0133601 | A1 | 6/2008 | Cerera |
| 2008/0155057 | A1 | 6/2008 | Khedouri |
| 2008/0155588 | A1 | 6/2008 | Roberts |
| 2008/0220855 | A1 | 9/2008 | Chen |
| 2008/0270221 | A1 | 10/2008 | Clemens |
| 2009/0024504 | A1 | 1/2009 | Lerman |
| 2009/0024510 | A1 | 1/2009 | Chen |
| 2009/0073174 | A1 | 3/2009 | Berg |
| 2009/0076939 | A1 | 3/2009 | Berg |
| 2009/0076974 | A1 | 3/2009 | Berg |
| 2009/0083307 | A1 | 3/2009 | Cervera |
| 2009/0089222 | A1 | 4/2009 | Ferreira De Castro |
| 2009/0106085 | A1 | 4/2009 | Raimbeault |
| 2009/0210415 | A1 | 8/2009 | Martin |
| 2009/0276368 | A1 | 11/2009 | Martin |
| 2010/0161595 | A1 | 6/2010 | Martin |
| 2010/0169328 | A1 | 7/2010 | Hangartner |

FOREIGN PATENT DOCUMENTS

| | | |
|---|---|---|
| EP | 1 231 788 A1 | 8/2002 |
| EP | 1420388 | 5/2004 |
| EP | 1 548 741 A1 | 6/2005 |
| JP | 11-052965 | 2/1999 |
| JP | 2002-108351 | 4/2002 |
| JP | 2002-320203 | 10/2002 |
| JP | 2003-255958 | 9/2003 |
| JP | 2004-221999 | 8/2004 |
| JP | 2005-027337 | 1/2005 |
| KR | 2002-025579 | 4/2002 |
| WO | WO 03/036541 A1 | 5/2003 |
| WO | WO03051051 A1 | 6/2003 |
| WO | WO2004070538 | 8/2004 |
| WO | WO2005013114 A1 | 2/2005 |
| WO | WO 2005/115107 A2 | 12/2005 |
| WO | WO2006052837 | 5/2006 |
| WO | WO2006075032 | 7/2006 |
| WO | WO2006114451 | 11/2006 |
| WO | WO 2007/038806 A3 | 4/2007 |
| WO | WO2007134193 | 5/2007 |
| WO | WO2007075622 | 7/2007 |
| WO | WO2007092053 | 8/2007 |
| WO | WO20090149046 A1 | 12/2009 |

OTHER PUBLICATIONS

Lie, "The Electronic Broadsheet—All The News That Fits The Display," MIT Master's Thesis, pp. 1-96 (Jun. 1991).
www.roweinternational.com/jukeboxes_dia.html, Web Page, Digital Internet Access Jukeboxes, Rowe International.
Jacucci, et al., Integrated Project on Interaction and Presence in Urban Environments. Feb. 9, 2007. Retrieved from the internet: <URL: http://ipcity.edu/wp-content/uploads/2007/02/D7.1%-%20Demonstrator%20of%20Large-Scale%20Events%20Application.pdf> see p. 20.
PCT/US07/068708; Filed May 10, 2007; International Search Report; WO 2007/134193; Dec. 7, 2007.
International Search Authority/US; PCT Search Report; Date Mar. 25, 2008; 3 Pages.
PCT/US2006/034218; International Search Authority; PCT International Search Report Feb. 9, 2007; 3 pages.
PCT/US06/38769; International Search Report Mar. 25, 2008.
PCT/US06/48330; International Bureau; PCT Search Report and Written Opinion; Mar. 20, 2008; 10 pages.
PCT/US2006/003795; International Search Report and Written Opinion; May 28, 2008.
Alvear, Jose, "Risk-Free Trial Streaming Media Delivery Tools," Streaming Media.com; www.streamingmedia.com/article.ap?id=5768, Jun. 30, 2000.
Deshpande, Mukund, et al., "Item-Based Top-N Recommendation Algorithms," ACM Transactions on Information Systems, 22:1 (Jan. 2004), pp. 143-177.
Pachet, Francois, A Taxonomy of Musical Genres, Content-Based Multimedia Information Access Conference (RIAO), Paris, Apr. 2000, 8 pages. Not Submitted in IDS.
Platt, John C. et al., "Learning a Gaussian Process Prior for Automatically Generating Music Playlists," Microsoft Corporation (platt, cburgess, sswenson, chriswea}-@microsoft.com, alcez@cs.berkeley.edu, pp. 1-9.
Platt, John S., "Fasting Embedding of Sparse Music Similarity Graphs," Microsoft Corporation, {jplatt@microsoft.com}.
Smart Computing, "The Scoop on File-Sharing Services," Dec. 2000, vol. 11, Issue 12; pp. 30-33 in printed issue. Available at www.smartcomputing.com/editorial/article.asp?article=articles%22F2000%Fs1112%2F08s12.asp.
www.akoo.com/Akoo/, Web Page, Akoo, Pick the Music, Waiting in the line at the Theme Park, Introducing the m-Venue™ platform.
www.axcessnews.com/modules/wfsection/article.php?articleid=8327, Web Page, Feb. 24, 2006, Maintenance Fees, Digital Music Sales Triple to $1.1 Billion in 2005.
www.bmi.com/news/200403/20040324b.asp, Web Page, BMI ™ Figures Don't Lie, Mar. 24, 2004, Touch Tunes Signs License Agreement for BMI Music in Digital Jukeboxes.
www.ecastinc.com/music_licensing.html, Web Page, Ecast Network, Interactive entertainment network, Music/Licensing.
www.rfidjournal.com/article/articleview/1619/1/1, Web Page, RFID brings messages to Seattle side walks on RFID system being deployed next week will send marketing and assistive information to users carrying active RFID tags. RFID Journal (pp. 1-4).
www.roweinternational.com/jukeboxes_dia.html, Web Page, Digital Internet Access Jukeboxes, Rowe International.
www.touchtunes.com, Web Page, Touchtunes, Turn your ROWE 100A's and 100B's into touch tunes Digital Jukeboxes—Bose.
www.alwayson-network.com/comments.php?id=P12663 0 37 0 C, Web Page, Not Your Average Jukebox, On Hollywood 1000 contender Ecast uses broadbank to being the digital media experience to your watering hole.
Cano, Pedro et al., On the Use of FastMap for Audio Retrieval and Browsing, The International Conference on Music Information Retrieval and Related Activities (ISMIR 2002), Paris, France, Oct. 2002, 2 pages.
Connell, Iain et al., Ontological Sketch Models: Highlighting User-System Misfits, in P. Palanque, E. O'Neill and P. Johnson, editors, Proceedings of Human Computer Interaction (HCI) Bath, England, Sep. 2003, London Springer, pp. 1-16.
The Trustees of Indiana University, Variations2, The Indiana University Digital Music Library, http://dml.indiana.edu/, last updated May 11, 2005, 1 page.
Logan, Beth, Content-Based Playlist Generation: Exploratory Experiments, The International Conference on Music Information Retrieval and Related Activities (ISMIR 2002), Paris, France, Oct. 2002, 2 pages.
Logan, Beth et al., A Music Similarity Function Based on Signal Analysis, IEEE International Conference on Multimedia and Expo (ICME), Tokyo, Japan, Aug. 2001, IEEE Press, pp. 952-955.
Maidin, Donncha O et al., The Best of Two Worlds: Retrieving and Browsing, Proceedings of the COST G-6 Conference on Digital Audio Effects (DAFX-00), Verona, Italy, Dec. 7-9, 2000, 4 pages.
Notess, Mark et al., Variations2: Toward Visual Interface for Digital Music Libraries, Second International Workshop on Visual Interfaces to Digital Libraries, 2002, 6 pages.
Pampalk, Elias et al., Content-based Organization and Visualization of Music Archives, ACM Multimedia, Juan les Pins, France, Dec. 2002, pp. 570-579.

Pauws, Steffen et al., PATS: Realization and User Evaluation of an Automatic Playlist Generator, The International Conferences on Music Information Retrieval and Related Activities (ISMIR 2002), Paris, France, Oct. 2002, 9 pages.

Rauber, Andreas et al., The SOM-enhanced JukeBox: Oganization and Visualization of Music Collections Based on Perceptual Models, Journal of New Music Research, vol. 32, Nov. 2, 2003, pp. 193-210.

Shneiderman, Ben, Tree Visualization with Tree-Maps: 2-d Space-Filling Approach, ACM Transactions on Graphics, vol. 11, No. 1, Jan. 1992, pp. 92-99.

Treemap, University of Maryland, http://www.cs.umd.edu/hcil/treemap/, last updated Aug. 5, 2003, 4 pages.

Shneiderman, Ben, Treemaps for Space-Contrained Visualization of Hierarchies, http://www.sc.umd.edu/heil/treemap-history/, last updated Apr. 28, 2006, 16 pages.

Tzanetakis, George et al., MARSYAS3D: A Prototype Audio Browser-Editor Using a Large Scale Immersive Visual and Audio Display, Proceedings of the 2001 International Conference on Auditory Display, Espoo, Finland, Jul./Aug. 2001, 5 pages.

"New Music Recommendation System is Based on FOAF Personal Profiling," www.masternewmedia.org/music_recommendation/music_recommendation_system_FOAF, Oct. 1, 2005.

"Social Networking Meets Music Listening: Mecora Launches Radio 2.0," www.masternewmedia.org/news/2006/04/13/social_networking_meets_music_listening.htm, Apr. 13, 2006.

Strands Business Solutions. "Integration Document v.2.0"; Published May 2008; [online retrieved on Jan. 21, 2010] Retrieved from the internet <URL: http://recommender.strands.com/doc/SBS-Integration-Document.pdf>; entire document-18 pages.

PCT/US09/68604 International Search Report and Written Opinion of the International Searching Authority; dated Feb. 17, 2010.

John Thompson, "A Graphic Representation of Interaction With the NEXIS News Database," MIT Thesis (May 1983).

Lippman, et al., "News and Movies in the 50 Megabit Living Room," IEEE/IEICE, Global Telecommunications Conference, pp. 1976-1981 (Nov. 15, 1987).

Bender, et al., "Newspace: Mass Media and Personal Computing," Proceedings of USENIX, Conference, pp. 329-348 (Summer 1991).

Lie, "The Electronic Broadsheet—All The News That Fits The Display," MIT Master's Thesis, pp. 1-96 (Jun. 1991).

Jonathan L. Orwant, "Doppelgänger: A User Modeling System," MIT Bachelor's Thesis (Jun. 1991).

"Lessons from LyricTimeTM: A Prototype Multimedia System" 4th IEEE ComSoc International Workshop on Multimedia Communications (Apr. 1992).

Belkins, et al., "Information Filtering and Information Retrieval: Two Sides of the Same Coin?", Commuications of the ACM (Dec. 1992).

Architecting Personalized Delivery of Multimedia Information,: Communications of the ACM (Dec. 1992).

Jonathan L. Orwant, "Doppelgänger Goes to School: Machine Learning for User Modeling," MIT Master of Science Thesis (Sep. 1993).

Jon Orwant, "Appraising the User of User Models: Doppelgänger's Interface," in: A. Kobsa and D. Litman (eds.), Proceedings of the 4th International Conference on User Modeling (1994).

Bender, "Twenty Years of Personalization: All about the Daily Me," Educause Review (Sep./Oct. 2002).

PCT/ES2005/00003 Written Opinion of the International Searching Authority Report dated Jun. 10, 2005.

PCT/ES2005/000213 Written Opinion of the International Searching Authority dated Jan. 12, 2006.

PCT/ES2005/00003 Written Opinion of the International Preliminary Examing Authority dated Mar. 19, 2007.

PCT/ES2005/00003 International Preliminary Report on Patentability (Ch II) Report dated May 22, 2007.

PCT/ES2005/000213 International Preliminary Report on Patentability (Ch 11) Report Dated Nov. 15, 2007.

ShopSmart: Product Recommendations through Technical Specifications and User Reviews; Alexander Yates et al. Temple University; CIKM; Oct. 26-30, 2008, Napa Valley, CA, USA; 2 pages.

"Communications of the ACM" Dec. 1992, vol. 35, No. 12 at pp. 26-28 (Introduction to special issue regarding Workshop on High Performance Information Filtering, Morristown, N.J. Nov. 1991).

Delivering Interactive Multimedia Documents over Networks; Shoshana Loeb; IEEE Communications Magazine; May 1992, 8 pages.

PolyLens: A Recommender System for Groups of Users; M. O'Connor, D. Cosley, J.A. Konstan, J. Riedl; European Conference on Computer Supported Co-Operative Work at Bonn, German; Published 2001; pp. 199-218.

Toward alternative metrics of journal impact: a comparison of download and citation data, Johan Bollen, Herbert Van de Sompel, Joan Smith, Rick Luce, Google.com, 2005, pp. 1-2.

Incremental tensor analysis: theory and applications, Jimeng Sun, Dacheng Tao, Spiros Papadimitriou, Philip Yu, Christos Faloutsos, ACM, Oct. 2008, pp. 1-37.

IEEE, no matched results, Nov. 11, 2009, 1 page.

Augmenting the Social Space of an Academic Conference; McCarthy, et al. Information School, University of Washington and Department of Computer Science and Engineering, University of Minnesota; pp. 1-10; Nov. 6-10, 2004.

Baluja, S., Seth, R., Sivakumar, D., Jing, Y., Yagnik, J., Kumar, S., Ravichandran, D., and Aly, M. "Video Suggestion and Discovery for YouTube: Taking Random Walks Through the View Graph". In WWW '08: Proceedings of the 17th international conference on World Wide Web, pp. 895-904, Beijing, China, 2008. ACM Press.

Carlson et al. "Internet Banking Market Developments and Regulatory Issues In the New Ecomomy: what Changed, and the Challenges for Economic Policy . . . ", May 2001; http://www.occ.gov/netbank/SGEC2000.pdf.

Co-Construction of Hybrid Spaces; Asa Rudstrom; A Dissertation submitted to the University of Stockholm in partial fulfillment of the requirements for the Degree of Doctor of Philosophy; Department of Computer and Systems Sciences Stockholm University and Royal Institute of Technology; pp. 1-69; Nov. 2005.

Das, A., Datar, M., Garg, A., and Rajaram, S. "Google News Personalization: Scalable Online Collaborative Filtering". In WWW '07: Proceedings of the 16th international conference on World Wide Web, pp. 271-280, New York, NY, USA, 2007. ACM Press.

Dean, J. and Ghemawat, S. "MapReduce: Simplied Data Processing on Large Clusters". Commun. ACM, 51(1):107-113, 2008.

Dempster, Y., Laird, N., and Rubin, D. "Maximum Likelihood from Incomplete Data via the EM Algorithm". Jour. of the Royal Stat. Soc., Ser. B., 39:1047-1053, 1977.

Hofmann, T. "Latent Semantic Models for Collaborative Filtering". ACM Transactions on Information Systems, 22:89-115, 2004.

Hofmann, T. "Unsupervised Learning by Probabilistic Latent Semantic Analysis". Mach. Learn., 42:177-196, 2001.

http://www.smartcomputing.com/editorial/article.asp?article=articles%2F2000%2Fs1112%2F08s12%2F08s12.asp.

Industry Standard, THE, Help FAQs for Standard Prediction Market, http://www.thestandard.com/help, downloaded Jun. 29, 2009.

Indyk, P. and Matousek, J. "Low-Distortion Embeddings of Finite Metric Spaces". In Handbook of Discrete and Computational Geometry, pp. 177-196. CRC Press, 2004.

International Search Report PCT/US2009/051233; Sep. 4, 2009; Strands, Inc.

IP City, Integrated Project on Interaction and Presence on Urban Environments-Demonstrators on Large-Scale Events Applications; ipcity.eu; Giulio Jacucci, John Evans, Tommi Ilmonen; pp. 1-37; Feb. 9, 2007.

Lazar, N.A.; Bayesian Empirical Likelihood; Technical Report, Carnegi Mellon University, Department of Statistics, 2000; 26 pages.

MobiLenin—Combining A Multi-Track Music Video, Personal Mobile Phones and a Public Display into Multi-User Interactive Entertainment; Jurgen Scheible, et al. Media Lab, University of Art and Design, Helsinki, Finland; pp. 1-10; Nov. 6-10, 2005.

PCT/US07/068708; Filed May 10, 2007; International Search Report and Written Opinion; WO 2007/134193; Dec. 7, 2007.

PCT/US09/42002; Filed Apr. 28, 2009; International Search Report and Written Opinion; Jun. 2009.

PCT/US09/45911; Filed Jun. 2, 2009; International Search Report and Written Opinion.

PCT/US2007/068708; International Search Report; May 10, 2007.

Scihira, I. "A Characterization of Singular Graphs". Electronic Journal of Linear Algebra, 16:451-462, 2007.

Toward University Mobile Interaction for Shared Displays; Tim Paek, et al.; Microsoft Research, Redmond, WA; pp. 1-4; Nov. 6-10, 2004.

Trustees of Indiana University, Variations2, The Indiana University Digital Music Library, http://dmi.indiana.edu/, last updated May 11, 2005.

Wolfers, Justin and Zitzewitz, Eric, Prediction Markets, Journal of Economic Perspectives, Spring 2004, pp. 107-126, vol. 18, No. 2.

Yen, Yi-Wyn, Apple announces a 32GB iPhone 3G by Jun. 15, 2009; The Industry Standard, Apr. 2, 2009, http://www.thestandard.com/predictions/channel/hardware, downloaded Apr. 8, 2009.

Apple: iTunes 4.2 User Guide for Windows; Dec. 2003; retrieved from the internet: URL: http://www2.austin.cc.tx.us/tcm/projects/itunes.pdf; pp. 10, 17-19.

PCT/US2007/09/45725; International Search Report_WO; Jul. 15, 2009.

PCT/US2006/004257 European Search Report Oct. 23, 2009.

N.A. Lazar; Bayesian Empirical Likelihood; Technical Report, Carnegi Mellon University, Department of Statistics, 2000; 26 pages.

S. Baluja, R. Seth, D. Sivakumar, Y. Jing, J. Yagnik, S. Kumar, D. Ravichandran, and M. Aly, "Video Suggestion and Discovery for YouTube: Taking Random Walks Through the View Graph". In WWW '08: Proceedings of the 17th international conference on Wold Wide Web, pp. 895-904, Beijing, China, 2008. ACM Press.

A. Das, M. Datar, A. Garg, and S. Rajaram. "Google news Personalization: Scalable Online Collaborative Filtering", In WWW '07: proceedings of the 16th international conference on World Wide Web, pp. 271-280, New York, NY, USA, 2007. ACM Press.

J. Dean and S. Ghemawat, "MapReduce: Simplied Data Processing on Large Clusters". Commun. ACM, 51 (1):107-113, 2008.

Y. Dempster, N. Laird, and D. Rubin. "Maximum Likelihood from Incomplete Data via the EM Algorithm". Jour. of the Royal Stat. Soc., Ser. B., 39:1047-1053, 1977.

T. Hofmann. "Unsupervised Learning by Probabilistic Latent Semantic Analysis". Mach. Learn., 42:177-196, 2001.

T. Hofmann. "Latent Semantic Models for Collaborative Filtering". ACM Transactions on Information Systems, 22:89-115, 2004.

P. Indyk and J. Matousek. "Low-Distortion Embeddings of Finite Metric Spaces". In Handbook of Discrete and Computational Geometry, pp. 177-196. CRC Press, 2004.

I. Scihira. "A Characterization of Singular Graphs". Electronic Journal of Linear Algebra, 16:451-462, 2007.

Mukund Deshpande et al., "Item-Based Top-N Recommendation Algorithms," ACM Transactions on Information Systems, 22:1 (Jan. 2004) pp. 143-177.

Tom Bunzel, "Easy Digital Music," QUE Publisher, Aug. 18, 2004, Chapters 5 and 8.

Chao-Ming et al. (Chao-Ming), Design and Evaluation and mProducer: a Mobile Authoring Tool for Personal Experience Computing [online], MUM 2004, College Park, Maryland, USA, Oct. 27-29, 2004 [retrieved on Dec. 17, 2010]. [http://citeseerx.ist.psu.edu/viewdoc/download?doi=10.1.1.131.2933&rep=rep1&type=pdf].

PCT/US2006/003795; International Search Report for International Application, dated May 28, 2008.

Apple: iTunes 4.2 User Guide for Windows; Dec. 2003; retrieved from the internet: URL: http://www2.austin.cc.tx.us/tcm/projects/itunes.pdf; pp. 10, 17-19.

SYSTEM FOR BROWSING THROUGH A MUSIC CATALOG USING CORRELATION METRICS OF A KNOWLEDGE BASE OF MEDIASETS

RELATED APPLICATIONS

This application is a continuation of U.S. patent application Ser. No. 12/858,229, filed on Aug. 17, 2010, which is a continuation of U.S. patent application Ser. No. 11/349,370, filed on Feb. 6, 2006, which claims priority from U.S. Provisional Application No. 60/649,945 filed Feb. 4, 2005, all of which are incorporated herein by this reference as though fully set forth.

COPYRIGHT NOTICE

© 2005-2006 MusicStrands, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This invention relates generally to systems for assisting users to navigate media item catalogs with the ultimate goal of building mediasets and/or discover media items. More specifically, the present invention pertains to computer software methods and products to enable users to interactively browse through an electronic catalog by leveraging media item association metrics.

BACKGROUND OF THE INVENTION

New technologies combining digital media item players with dedicated software, together with new media distribution channels through networks are quickly changing the way people organize and play media items. As a direct consequence of such evolution in the media industry, users are faced with a huge volume of available choices that clearly overwhelm them when choosing what item to play in a certain moment.

This overwhelming effect can be easily detected in the music arena, where people are faced with the problem of selecting music from very large collections of songs. However, in the future, we might detect similar effects in other domains like music videos, movies, news, etc.

In general, our invention is applicable to any kind of media item that can be grouped by users forming mediasets. For example, in the music domain, these mediasets could be playlists. Users put music together in playlists to overcome the problem of being overwhelmed when choosing a song from a large collection, or just to enjoy a set of songs in particular situations. For example, one might be interested in having a playlist for running, another for cooking, etc.

This invention addresses the problem of helping users navigate through a media item catalog based on a small set of selected media items. This set of selected media items can be seen as an initial set to build a starting point for the navigation experience.

Different approaches can be considered when building systems to help users navigate a media item catalog. The most commonly used is the keyword based search where the user specifies a set of keywords and the system retrieves the set of media items which contain the keywords in their descriptors. Another approach is to consider a search based on metadata. For example in the music arena, a user might be asking to retrieve rock songs from the 90s.

However, many times users do not know what they are looking for. They want to explore the catalog and find interesting items. This observation is especially relevant for media item catalogs with a clear entertainment focus.

Various approaches can be adopted to personalized recommendations. One kind of approach is about using human expertise to classify the media items and then use these classifications to infer recommendations to users based on an input mediaset. For instance, if in the input mediaset the item x appears and x belongs to the same classification as y, then a system could recommend item y based on the fact that both items are classified in a similar cluster. However, this approach requires an incredibly huge amount of human work and expertise. Another approach is to analyze the data of the items (audio signal for songs, video signal for video, etc) and then try to match users preferences with the extracted analysis. This class of approaches is yet to be shown effective from a technical point of view.

Hosken (U.S. Pat. No. 6,438,579) describes a system and method for recommending media items responsive to query media items based on the explicit and implicit user characterizations of the content of the media items. Dunning, et. al. (U.S. Patent Application Pubs 2002/0082901 and 2003/0229537) disclose a system and method for discovering relationships between media items based on explicit and implicit user associations between said items. The need remains for improved methods and systems to assist users in navigating through media item catalogs with the ultimate goal of helping them build mediasets and/or discover media items that they will enjoy.

SUMMARY OF PREFERRED EMBODIMENTS

In one embodiment the invention comprises a system, preferably implemented in computer software, for guiding users along an interactive, personalized path through a media item catalog beginning from an initial selection by the user of one or more media items. As explained below, "media items" as used herein includes, by way of example and not limitation, music tracks or songs, albums, movies, music videos, other video "clips," news articles, other media, including text, graphics, multi-media presentations, etc. Preferably, the media items themselves, i.e. the actual content, is not part of the present system. Rather, each media item is identified by meta data.

The system requires a knowledge base consisting of a collection of mediasets. Mediasets are sets of media items that are naturally grouped by users. The mediasets of the knowledge base define metrics among items. Such metrics indicate how correlated media items are in the mediasets of the knowledge base. For each media item of the initial set, the system generates one list of media items for each metric of the system. The media items of these lists are the ones with highest metrics with respect to the associated media item. The user can then select any of the media items of the proposed lists, and the selected list becomes part of the initial set of media items, resulting in newly generated lists being proposed to the user. The process is interactive. Advantages of such interactivity include easier and more effective browsing through the catalog and/or building a new appropriate mediaset.

Additional aspects and advantages will be apparent from the following detailed description of preferred embodiments, which proceeds with reference to the accompanying drawings.

DETAILED DESCRIPTION OF PREFERRED EMBODIMENTS

Figures 1, 2:
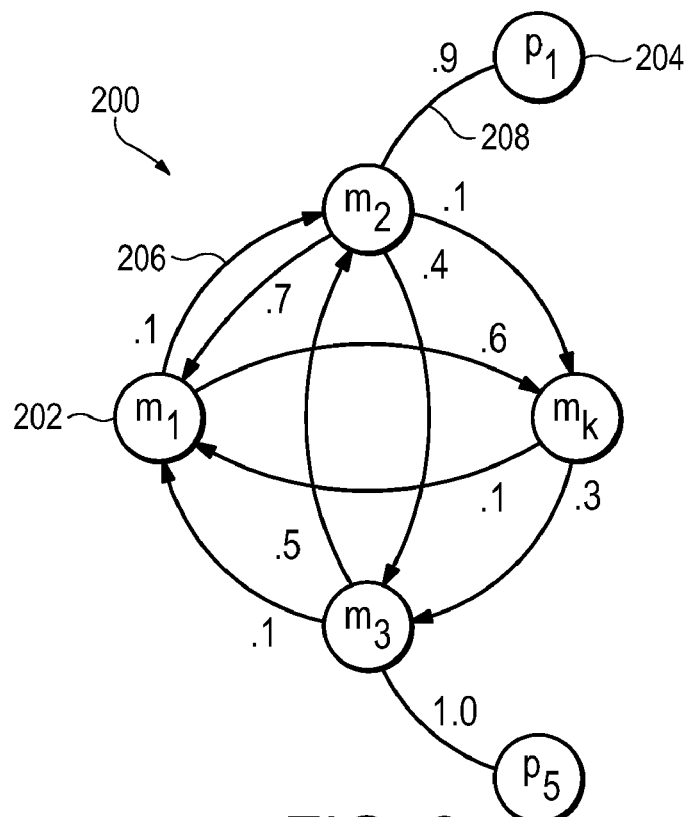
FIG. 1 is a representation in matrix form of a metric describing the similarity values between collections of media items.
FIG. 2 illustrates a weighted graph representation for the associations within a collection of media items. Each edge between two media items is annotated with a weight representing the value of a selected metric for the similarity between the media items.

Reference is now made to the figures in which like reference numerals refer to like elements. For clarity, the first digit of a reference numeral indicates the figure number in which the corresponding element is first used.

In the following description, certain specific details of programming, software modules, user selections, network transactions, database queries, database structures, etc. are omitted to avoid obscuring the invention. Those of ordinary skill in computer sciences will comprehend many ways to implement the invention in various embodiments, the details of which can be determined using known technologies.

Furthermore, the described features, structures, or characteristics may be combined in any suitable manner in one or more embodiments. In general, the methodologies of the present invention are advantageously carried out using one or more digital processors, for example the types of microprocessors that are commonly found in servers, PC's, laptops, PDA's and all manner of desktop or portable electronic appliances.

DEFINITIONS

The system comprises a knowledge base which is a collection of mediasets. A mediaset is a list of media items that a user has grouped together. A media item can be of different nature, e.g. a song, a book, a newspaper, a movie, a piece of a radio program, etc. If a mediaset is composed of the same type of media items it is called a homogeneous mediaset, otherwise it is called a heterogeneous mediaset. A mediaset can be ordered or unordered. An ordered mediaset implies a certain order with respect to the sequence in which the items are used[1] by the user.

[1] Depending on the nature of the item, it will be played, viewed, read, etc.

In general, mediasets are based on the assumption that users group media items together following some logic or reasoning. For example, in the music domain, a user may be selecting a set of songs for driving, hence that is a homogeneous mediaset of songs. In this invention, we also consider other kinds of media items such as books, movies, newspapers, and so on. For example, if we consider books, a user may have a list of books for the summer, a list of books for work, and another list of books for the weekends. A user may be interested in expressing a heterogeneous mediaset with a mix of books and music, expressing the music that goes well with certain books.

A set of media items is not considered the same as a mediaset. The difference is mainly about the intention of the user in grouping the items together. In the case of a mediaset the user is expressing that the items in the mediaset go well, in some sense, with his personal preferences. On the other hand, a set of media items does not express necessarily the preferences of a user. We use the term set of media items to refer to the input of the system of the invention as well as to the output of the system.

A metric M between a pair of media items i and j for a given knowledge base k expresses some degree of relation between i and j with respect to k. A metric may be expressed as a distance, where smaller distance values represent stronger association values, or as a similarity, where larger similarity values represent stronger association values. The most immediate metric is the co-concurrency (i, j) that indicates how many times item i and item j appear together in any of the mediasets of k. The metric pre-concurrency (i, j) indicates how many times item i and item j appear together but i before j in any of the mediasets of k. The metric post-concurrency (i, j) indicates how many times item i and item j appear together but i after j in any of the mediasets of k. The previous defined metrics can also be considered considering immediate sequence of i and j. So, the system might be considering co/pre/post-concurrencies metrics but only if items i and j are consecutive in the mediasets (only available if the mediasets are ordered). Other metrics can be considered and also new ones can be defined by combining the previous ones.

A metric may be computed based on any of the above metrics and applying transitivity. For instance, consider co-concurrency between item i and j, co(i,j), and between j and k, co(j,k), and consider that co(i,k)=0. We could create another metric to include transitivity, for example d(i,k)=1/co(i,j)+1/co(j,k). These type of transitivity metrics may be efficiently computed using standard branch and bound search algorithms.

A matrix representation of metric M, (FIG. 1) for a given knowledge base K can be defined as a bidimensional matrix (100) where the element M(i, j) (106) is the value of the metric between the media item i (102) and media item j (104).

A graph representation for a given knowledge base k, (FIG. 2) is a graph (200) where nodes represent media items (202, 204), and edges (206, 208) are between pairs of media items. Pairs of media items i, j are linked by labeled directed edges, where the label indicates the value of the similarity or distance metric M(i,j) for the edge with head media item i and tail media item j.

Figure 4:
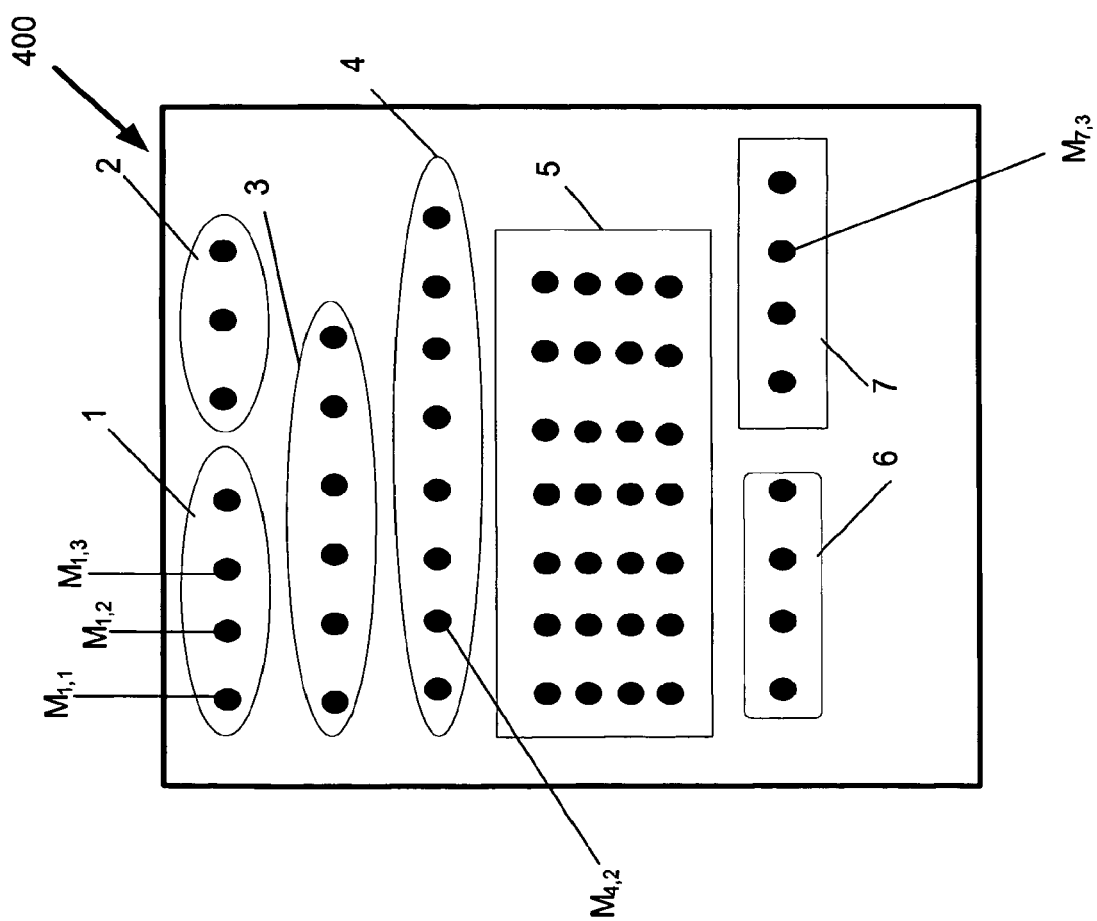
FIG. 4 is a simplified, conceptual diagram of a knowledge base comprising a plurality of mediasets useful to derive metric values.

As a preliminary matter, in a presently preferred embodiment, a pre-processing step is carried out to analyze the contents of an existing knowledge base. This can be done in advance of receiving any input items. As noted above, the knowledge base comprises an existing collection of mediasets. This is illustrated in FIG. 4, which shows a simplified conceptual illustration of a knowledge base 400. In FIG. 4, the knowledge base 400 includes a collection of mediasets, delineated by rectangles [or ovals] and numbered 1 through 7. Each mediaset comprises at least two media items. For example, mediaset 2 has three items, while mediaset 7 has four items. The presence of media items within a given mediaset creates an association among them.

The present invention requires a knowledge base of mediasets, or at least access to metrics derived from a knowledge base. A knowledge base can be analyzed based on any selected metric. In general, for present purposes, such metrics reflect and indeed quantify some association between pairs of media items in a given knowledge base. The analysis process is described by way of example using the co-concurrency metric mentioned earlier. A similar process can be used for other metrics. Referring still to FIG. 4, for each item in a mediaset (in the knowledge base), the process identifies every other item in the same mediaset, thereby defining all of the pairs of items in that mediaset. For example, in FIG. 4, one pair in mediaset 1 is the pair $M_{(1,1)}+M_{(1,3)}$. Three pairs are defined that include $M_{(1,1)}$. This process is repeated for every mediaset in the knowledge base, thus every pair of items that appears in any mediaset throughout the knowledge base is defined.

Next, for each pair of media items, a co-concurrency metric is incremented for each additional occurrence of the same pair of items in the same knowledge base. For example, if a pair of media items, say the song "Uptown Girl" by Billy Joel and "Hallelujah" by Jeff Buckley, appear together in 42 different mediasets in the knowledge base (not necessarily adjacent one another), then the co-concurrency metric might be 42 (or some other figure depending on the scaling selected, normalization, etc. In some embodiments, this figure or co-concurrency "weight" may be normalized to a number between zero and one.)

Referring now to FIG. 1, matrix 100 illustrates a useful method for storing the metric values or weights for any particular metric. Here, individual media items in the knowledge base, say $m_1, m_2, m_3 \ldots m_k$ are assigned corresponding rows and columns in the matrix. In the matrix, the selected metric weight for every pair of items is entered at row, column location x,y corresponding to the two media items defining the pair. In FIG. 1, the values are normalized to a range of zero to one, but other normalization is merely a design choice.

Figure 3:
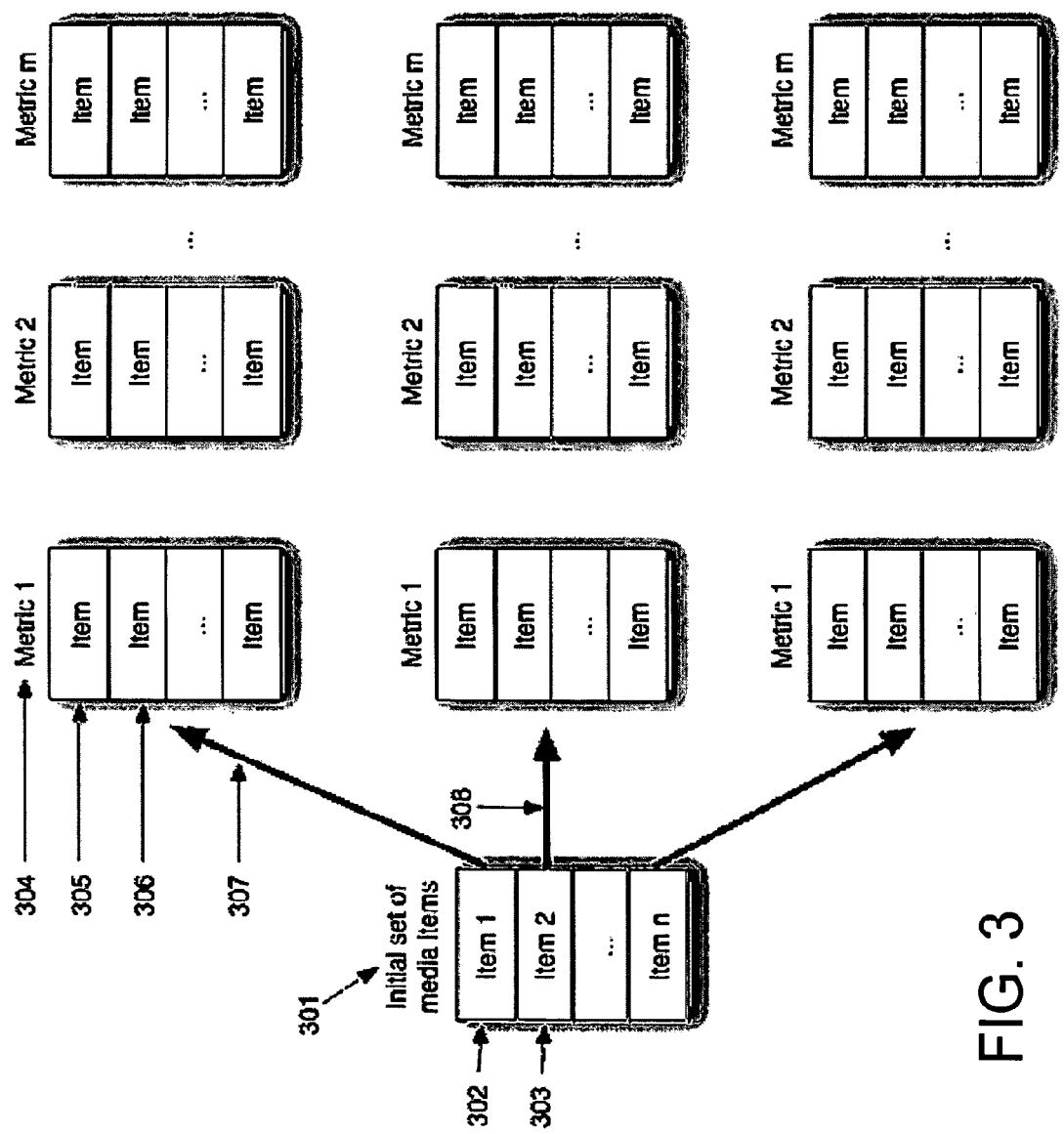
FIG. 3 is simplified, conceptual diagram illustrating the generation of navigation lists from an input set of media items based on knowledge base metrics.

Referring now to FIG. 3, the user selects an initial set of items from the catalog (301). For each of the items in this initial set (302, 303), the system generates (307, 308) one list for each metric. Hence, for an initial set (301) of n items and a system with m metrics, the system generates n*m lists. The ordered list with respect to item i and metric M (304) contains the k items (305, 306, 307) with the highest metric M with respect to item i.

Figure 5:
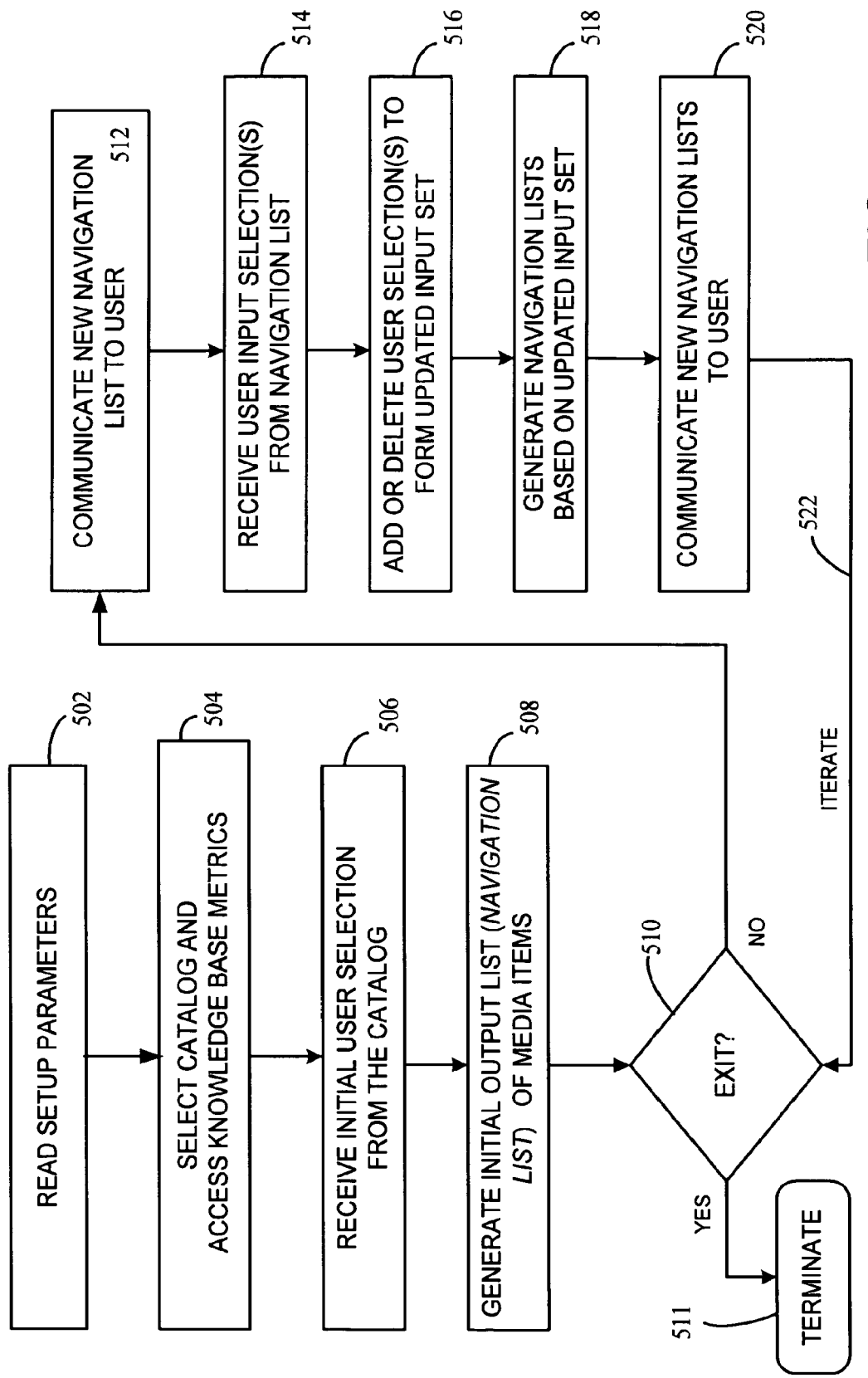
FIG. 5 is a flow diagram illustrating an interactive method for guiding users through a media item catalog.

The system displays or otherwise communicates the generated lists to the user, and from these the user can select any item. Referring now to FIG. 5, a flow diagram illustrates one example of this process. Initially, the software system receives or reads setup parameters 502. These may pertain to the selection of metrics, user login, length of lists, time limits, or other operational parameters. Then the system or the user selects a catalog for browsing 504. The system also obtains access to a collection of metrics derived from an associated knowledge base. Next, as noted, the user selects one or more media items from the catalog 506 to form an initial input mediaset. The system receives that input, and then generates in 508 an initial output list of media items we call a navigation list, preferably in the manner described above with reference to FIG. 3.

Continuing with reference to FIG. 5, the system receives further feedback from the user, which may be an instruction to exit from the process 510, in which case it may terminate 511. (The exit may occur at any time; this flowchart is merely illustrative.) If the user continues, he makes a selection 514 of one or more of the media items on the navigation list to add or delete. The system then adds (or deletes) the user selection(s) to the initial input mediaset 516, thus forming a new input set. New navigational lists are then generated based on the new input set 518. The new navigation lists are communicated to the user, 520. The process loops as indicated at 522.

In this way, the user is interactively guided through the catalog as he or she continues to add new items. The user may edit the navigation set at any moment by deleting items from, or adding items to, the generated lists. Every time the users interacts with the navigation set, its associated lists are updated as the system reacts to each edit of the navigation set. The previously described process has various advantageous uses, including assisting users to (a) navigate through a media item catalog, or (b) create new mediasets in a convenient way. A new mediaset can be saved by storing the current input set, or any navigation list, at any time during the interaction.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims.

For example, one of ordinary skill in the art will understand that, while the above system and methods were described as embodied in a media item catalog system, it should be understood that the inventive system could be used in any system that implements a catalog for items that can be grouped by users following some selected criteria. Although specific terms are employed herein, there are used in a generic and descriptive sense only and not for purposes of limitation.

It will further be apparent to those having skill in the art that many changes may be made to the details of the above-described embodiments without departing from the underlying principles of the invention. The scope of the present invention should, therefore, be determined only by the following claims.

The invention claimed is:

1. A computer-implemented method of assisting a user in selecting items from an electronic catalog of media items, the method comprising:
   (a) obtaining access to metric values derived from a knowledge base of predetermined mediasets associated with the electronic catalog; wherein the metric values reflect a level of association for each of the pairs of media items within the knowledge base of mediasets and the metric values are not affected by any descriptor, characteristic, classification or other descriptive metadata of the media items' content;
   (b) receiving an initial selection of at least one media item to define an initial input media set;
   (c) generating an output media item navigation list responsive to at least one item of the input media set, based on the metric values, and the output media item list comprising at least one media item from the electronic catalog; and
   (d) communicating the generated navigation list to a user.

2. The method of claim 1 further comprising the steps of:
   (e) receiving from the user an instruction to edit the navigation list;
   (f) editing the navigation list as instructed by the user to define a new input set;
   (g) responsive to the new input media set, generating a new navigation output list based on the association metric values; and
   (h) communicating the new navigation list to the user.

3. The method according to claim 2 wherein said editing step includes adding a user-selected media item to the initial input media set to define the new input set.

4. The method according to claim 2 wherein said editing step includes:
   receiving from the user a selection of at least one media item on the navigation list for deletion; and
   deleting the user-selected media item from the initial input media set to form the new input set.

5. The method according to claim 1 wherein said communicating step comprises communication over a network for displaying the navigation list on a remote client device.

6. The method according to claim 1 wherein said communicating step comprises communication over a network for displaying the navigation list on a mobile client device.

7. The method according to claim 1 and further comprising ordering the generated navigation list according to the association metric values used to generate the navigation list.

8. The method according to claim 1 and further comprising filtering the generated navigation list responsive to predetermined constraints.

9. The method according to claim 1 wherein the initial input media set comprises a playlist.

10. The method according to claim 1 wherein the user comprises a remote software process rather than a person.

11. The method according to claim 2 including repeating steps (e) through (h) to realize an interactive browsing session.

12. The method according to claim 1 wherein the catalog media items comprise recorded music tracks.

13. The method according to claim 12 wherein the association metric values comprise co-concurrency metric values including at least one of a pre-concurrency metric, a post-concurrency metric, and a combination of the foregoing metrics applied transitively.

14. The method according to claim 12 wherein the association metric values comprise co-concurrency metric values, the co-concurrency metric values indicating, for each pair of media items (i,j), how many times item i and item j appear together within any of the mediasets of the knowledge base.

15. A computer-readable storage medium having computer-readable program code stored therein, said computer-readable program code including:
   computer-readable program code for receiving a selection of a catalog for user browsing and for accessing a collection of metric data associated with the selected catalog;
   wherein the metric data comprises metric values for pairs of media items derived from a knowledge base of mediasets;
   wherein the metric values reflect a level of co-concurrency for each of the pairs of media items within the knowledge base of mediasets; and further wherein the co-concurrency metric values indicate, for each pair of media items (i,j), how many times item i and item j appear together within any of the mediasets of the knowledge base, so that the co-concurrency metric values are not affected by any descriptor, characteristic, classification or attribute of the media items' content;
   computer-readable program code for receiving from the user an initial selection of at least one media item from the selected catalog to define an initial input media set;
   computer-readable program code for generating a navigation list based on selected metrics for each item of the initial input media set; and
   computer-readable program code for communicating the generated navigation list to the user.

* * * * *